April 22, 1924.

J. DLESK

DOLLY

Filed April 5, 1923

1,491,468

Inventor:
John Dlesk,
By Dyrenforth, Lee, Chritton and Wiles,
Attys.

Patented Apr. 22, 1924.

1,491,468

UNITED STATES PATENT OFFICE.

JOHN DLESK, OF BERWYN, ILLINOIS, ASSIGNOR TO U. S. BALL BEARING MFG. COMPANY, OF CHICAGO, ILLINOIS, A CORPORATION OF ILLINOIS.

DOLLY.

Original application filed February 10, 1922, Serial No. 835,531. Divided and this application filed April 5, 1923. Serial No. 630,016.

*To all whom it may concern:*

Be it known that I, JOHN DLESK, a citizen of the United States, residing at Berwyn, in the county of Cook and State of Illinois, have invented a new and useful Improvement in Dollies, of which the following is a specification.

This invention relates to a dolly for assembling two-row radial ball bearings, and the like, and is fully described in the following specification and shown in the accompanying drawings, in which.

This is a division of my pending application Serial No. 835,531, filed February 10th, 1922.

The two-row radial bearing as illustrated consists of inner and outer race members 10 and 11 respectively which have parallel raceways $10^a$ and $11^a$ formed therein. Balls 12 are introduced into these grooves through the well known filling notches $10^b$ and $11^b$ which are formed in the inner and outer races members respectively.

In assembling bearings of this kind, it is a very simple matter to assemble a riveted retainer 13 upon one of the ball races, while the balls in the other race are not yet in place. It is a very much more difficult matter, however, to assemble the retainer upon the second row of balls with the first row of balls with its retainers in place, since riveting tools and the like cannot then be introduced from the bottom of the bearing through the space between the race members as shown in Fig. 2, because of the lower retainer, 13.

Figure 1:
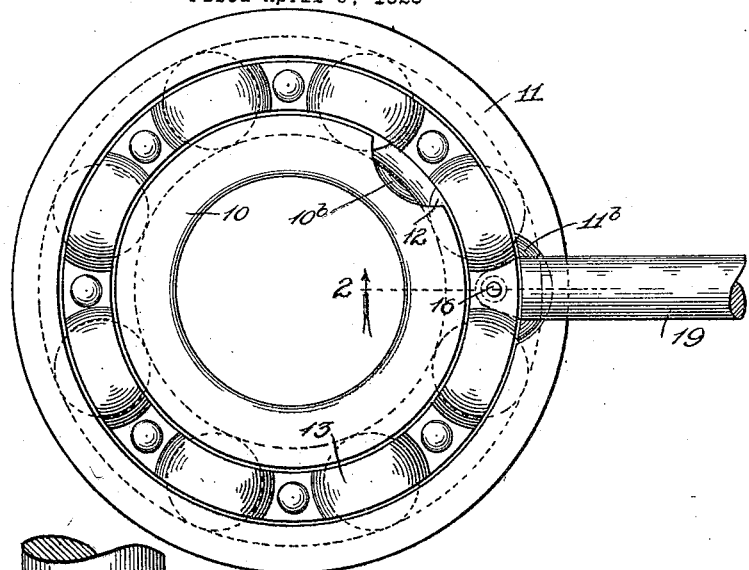
Figure 1 is a plan view of a two-row radial bearing being assembled by this method.
Figure 2:
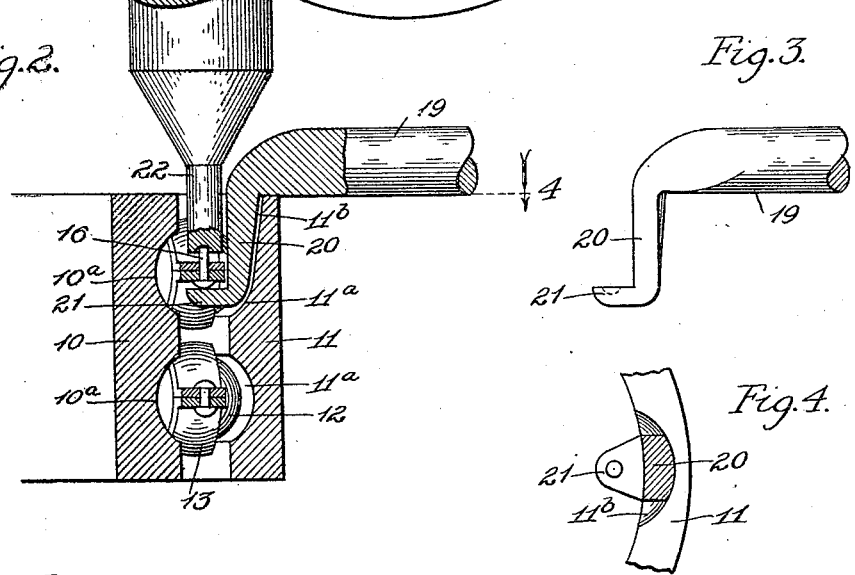
Fig. 2 is a vertical section on the line 2 of Fig. 1.
Figure 3:
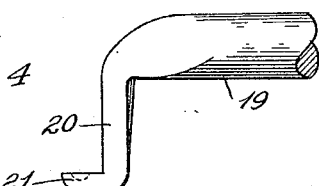
Fig. 3 is a partial side elevation of a dolly.
Figure 4:
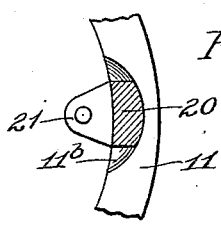
Fig. 4 is a partial plan view on the line 4 of Fig. 2.
Figure 5:
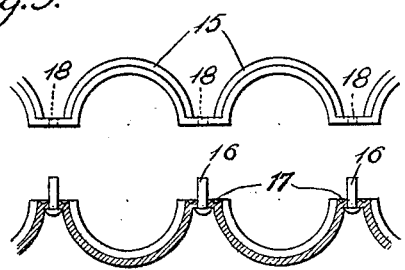
Fig. 5 is a developed partial side elevation of the two halves of the ball retainer previous to being assembled.

In order to overcome this difficulty I employ a retainer composed of two sections 14 and 15 which are placed below and above the second row of balls respectively as shown in Fig. 2. The lower section has a series of rivets 16 extending through holes therein and secured by piening or center-punching the material 17 about the rivet. These rivets are adapted to pass through holes 18 in the upper section.

After assembling the retainer sections loosely around the balls in the upper section as shown in Fig. 2, a dolly consisting of a shank portion 19, an intermediate portion 20 bent substantially at right angles thereto and a lip portion 21 is inserted through one of the filling slots as $11^b$, the race member having been turned so as to bring one of the rivets 16 immediately in front of this filling slot. The shank 19 of the dolly then rests upon the upper edge of the outer race member 11 while the lip 21 engages the under side of the head on the rivet 16. By holding the outer end of the shank 19 of the dolly, the rivet 16 is firmly held while the upper head is formed as by means of the riveting tool 22.

While the dolly 19 is shown as being inserted through the filling slot $11^b$ of the outer race member, it will be understood that it it can be inserted through the filling slot $10^b$ in the inner race member when desired.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new and desire to secure by Letters Patent, is:

1. A dolly adapted to be used in assembling riveted retainers on two row ball bearings, said dolly having a shank portion, an intermediate portion extending at an angle to said shank portion, and a lip portion extending at an angle to the intermediate portion and adapted to reach under a rivet in the ball retainer to support the same, said intermediate portion having an arcuate back adapted to substantially fit the back of the filling slot of one of the race members.

2. A dolly adapted to be used in assembling riveted retainers on two row ball bearings, said dolly having a shank portion, an intermediate portion extending at an angle to said shank portion, and a lip portion extending at an angle to the intermediate portion and adapted to reach under a rivet in the ball retainer to support the same, said intermediate portion having an arcuate back adapted to substantially fit the back of the filling slot of one of the race members, said shank being adapted to fulcrum on the edge of the ball race.

JOHN DLESK.